United States Patent
Weber

(10) Patent No.: US 6,364,297 B1
(45) Date of Patent: Apr. 2, 2002

(54) TORSION BAR ANCHOR

(75) Inventor: Matthew W. Weber, Pinckney, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/587,230

(22) Filed: Jun. 2, 2000

(51) Int. Cl.[7] .............................................. B60G 11/20
(52) U.S. Cl. ................ 267/273; 280/124.137
(58) Field of Search .................. 267/273; 280/124.137, 280/124.149, 124.166, 124.167

(56) References Cited

U.S. PATENT DOCUMENTS

| | | | |
|---|---|---|---|
| 2,606,020 A | * | 8/1952 | Anderson .................. 267/273 |
| 2,969,250 A | | 1/1961 | Kull |
| 3,198,507 A | * | 8/1965 | Kozicki ................... 267/273 |
| 3,621,945 A | | 11/1971 | Spry |
| 4,106,311 A | | 8/1978 | Euler |
| 4,681,307 A | * | 7/1987 | Leonard ................... 267/273 |
| 5,460,574 A | | 10/1995 | Hobaugh |
| 5,782,148 A | * | 7/1998 | Kerkhoven ................ 267/273 |

* cited by examiner

*Primary Examiner*—Matthew C. Graham
(74) *Attorney, Agent, or Firm*—Robert E. Smith

(57) ABSTRACT

An improved torsion bar and socket system for a motor vehicle is provided. The socket includes a main hexagonal shaped opening having a plurality of scalloped openings extending therefrom. The socket includes a contact wall that defines a portion of the main hexagonal opening and an extending wall extending therefrom at an angle. The contact wall is adapted to contact the torsion bar and either apply rotational force thereto or receive rotational force therefrom. The extending wall is formed tangent to a circular wall which is also tangent to another contact wall. The circular wall and extending wall form a scalloped opening which is used during insertion of the torsion bar into the socket.

17 Claims, 3 Drawing Sheets

TORSION BAR ANCHOR

BACKGROUND OF THE INVENTION

1. Technical Field

The present invention relates in general to motor vehicles. More particularly, the present invention relates to an improved torsion bar and socket systems for motor vehicles. More specifically, but without restriction to the particular embodiment and/or use which is shown and described for purposes of illustration, the present invention relates to an improved torsion bar and socket system for motor vehicles that improves durability, manufacturability, and assembly of the torsion bar and socket.

2. Discussion

Every motor vehicle has a plurality of wheels that are adapted to contact a road surface. Practically every vehicle has some type of suspension system to compensate for variations in the road surface. Core to the essence of every vehicle suspension system is the spring associated with each vehicle wheel. The spring is the component that absorbs bumps and shocks while maintaining proper ride height. If the spring component is damaged or excessively worn, it affects not only ride height and shock absorption but it also detrimentally affects all of the other suspension components.

Automotive springs are generally classified in one of the following types: coil springs, air springs, leaf springs, and torsion bar springs. The spring urges a component, such as a control arm, which attaches the wheel to the frame downward. The springs are selected and set such that the weight of the vehicle determines its ride height position, a position where the spring is partially compressed by the weight of the vehicle. If the same spring is used on two separate vehicles, the lighter vehicle will have a higher ride height and the heavier vehicle would have a lower ride height. To maintain an equivalent ride height between two vehicles of varying weights, the heavier vehicle would require a stiffer (higher spring rate constant) spring that requires more force to compress. All automotive springs accommodate two types of vertical actions: jounce and rebound. Rebound occurs when the wheel of the vehicle hits a dip in the road and the wheel moves downward from its ride height position relative to the vehicle frame. This downward motion is encouraged by the spring, which wants to achieve its uncompressed state. The spring's uncompressed state is typically set beyond the full rebound position of the associated control arm. The weight of the vehicle acting against the extended spring is what returns the wheel to its ride height position. Jounce occurs when a wheel of the vehicle hits a bump and moves upward in relation to the vehicle frame. When this happens, the spring acts to push the wheel back downward towards its ride height position. The jounce condition compresses the spring from its previously described compressed ride height position. Therefore, the spring acts to move the wheel downward away from the vehicle frame.

The present invention concerns an improved torsion bar type spring and end socket for connecting the spring to the vehicle body. A torsion bar absorbs energy when rotated about its axis whereas a coil spring absorbs energy when moved in an axial direction. A conventional torsion bar is connected at a first end to the vehicle frame or other suitably fortified portion of a vehicle body. The second end of the torsion bar is typically attached to the lower control arm of the wheel support. The torsion bar is set-up to be prestressed so as the wheel moves towards its full rebound position, the torsion bar tends to unwind and become less stressed. At the vehicle ride height position, the torsion bar is partially compressed by rotation. As the lower control arm moves up such as during jounce movement, the torsion bar is twisted in a first direction tending to stress the spring because of its connection to the vehicle frame. This twisting of the spring creates a return force in a second direction, towards the full rebound position. As the lower control arm continues to an increased jounce condition, the torsion bar is twisted further in the first direction, thus producing an increasing return force in the second direction. After the jounce movement the lower control arm moves towards the rebound position, and the weight and downward inertia of the vehicle acts to partially stress the torsion bar and return the vehicle to its desireable ride height position.

A cross section of a conventional torsion bar type spring and end socket design is shown in FIG. 2 of the present application. The torsion bar includes an elongated and generally cylindrical main shaft with hexagon shaped opposing end portions (only one is shown in FIG. 2). Each end is inserted into a socket configured with a hexagonally shaped opening that is slightly larger than the end portion of the torsion bar. As is generally seen from FIG. 1, the first end portion is inserted into a first socket that is formed with the lower control arm. The second end portion is inserted into a similar second socket that is attached to the vehicle frame. Although a longitudinally extending torsion bar is shown in FIG. 1, it is also common to employ a laterally extending torsion bar. As the wheel and lower control arm move upward from a rebound position, the first socket imparts a twisting force on the torsion bar in a first direction. At the same time, the opposite end portion of the torsion bar is restrained from rotating by the second socket which exerts force on the frame. Because of the twisting of the torsion bar rotational energy is absorbed. As can be seen from FIG. 2, the end socket is required to either initiate or counteract the rotational tendencies of the torsion bar. Durability of sockets as well as the torsion bars is a concern.

The opening in the socket needs to be slightly larger than the end portion of the torsion bar, because of build variations and the fact the torsion bar must be inserted into the socket. The socket is subjected to line contact at six different locations around the opening. This line contact has a detrimental effect on the socket which might lead to deformation of the socket, and resultant loss of ride height.

Another inherent difficulty in construction of the conventional torsion bar system shown in FIG. 2 is that the opening in the socket is constructed with very small radii in the six corners of the hexagon opening, which is very difficult and expensive to accomplish repeatedly and effectively.

Yet another difficulty with the construction of conventional torsion bar systems is an incapatibility between durability factors and installation considerations. For durability, the opening needs to be only slightly larger that the end portion of the torsion bar. For ease of installation, a larger opening is desired. This requires designers to balance these competing considerations, therefore, making it difficult to improve both the durability and installation of a torsion bar and socket system.

SUMMARY OF THE INVENTION

Accordingly, it is the principal objective of the present invention to provide a torsion bar and socket system with improved durability.

It is another objective of the present invention to provide a torsion bar and socket system that eases the installation of the torsion bar into the socket.

It is yet another objective of the present invention to provide a torsion bar and socket system that is easy to manufacture.

In one form, the present invention concerns an improved torsion bar and end socket system. The present invention works with a standard torsion bar having a hexagon shaped end portion that is adapted to be received in a socket. The socket of the present invention includes a main opening that is substantially equal in size to the hexagonal shaped end portion of the torsion bar. The socket includes six scalloped fillets or openings.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views.

DETAILED DESCRIPTION OF THE PREFERRED EMBODIMENT

An improved torsion bar and socket system is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
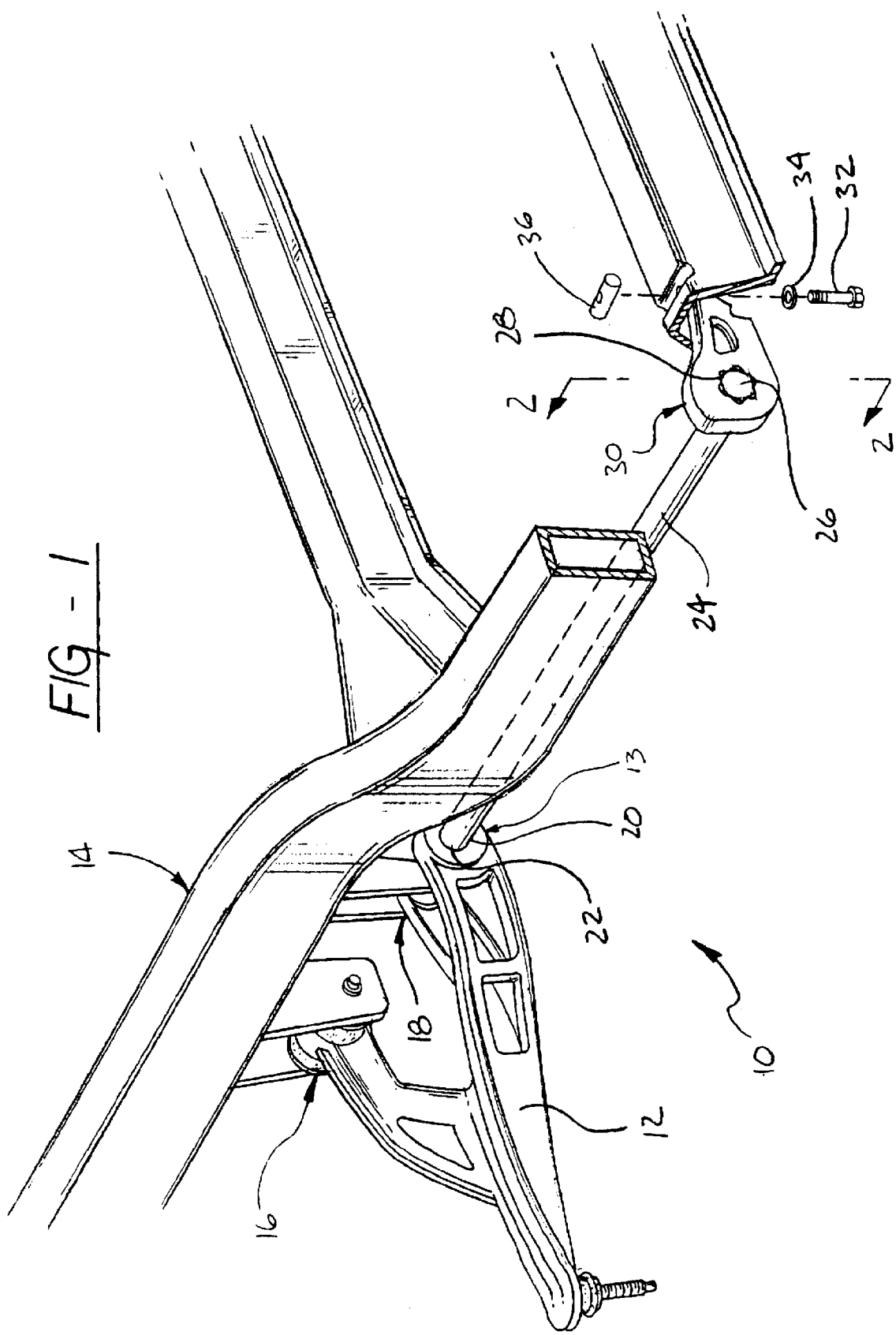
FIG. 1 is a perspective view of the front suspension system of a motor vehicle including a torsion bar and end socket.

Referring now to the drawings, FIG. 1 illustrates a front suspension system 10 of a motor vehicle. Suspension system 10 includes a lower control arm 12 that is adapted to provide a support link for a wheel (not shown) to a vehicle frame 14. Lower control arm 12 is pivotally attached to frame 14 at a front bushing 16 and a rear bushing 18. Vertical movements of the associated wheel causes lower control arm 12 to pivot about an axis formed through front bushing 16 and rear bushing 18. Formed within the lower control arm 12 is a first torsion bar socket 20 that is formed in an anchor portion 13 of the lower control arm 12. First torsion bar socket 20 receives a first end portion 22 of an elongated torsion bar 24. Torsion bar 24 extends rearward and terminates in a second end portion 26. Second end portion 26 is received by a second torsion bar socket 28 formed in an anchor member 30. Anchor member 30 is attached to vehicle frame 14 via a standard adjustment bolt 32, bearing 34, and bolt receiving swivel nut 36. Bolt 32 can be rotated to change the rotational force on torsion bar 24 and consequently change the ride height of the vehicle in a manner well known in the art.

Figure 2:
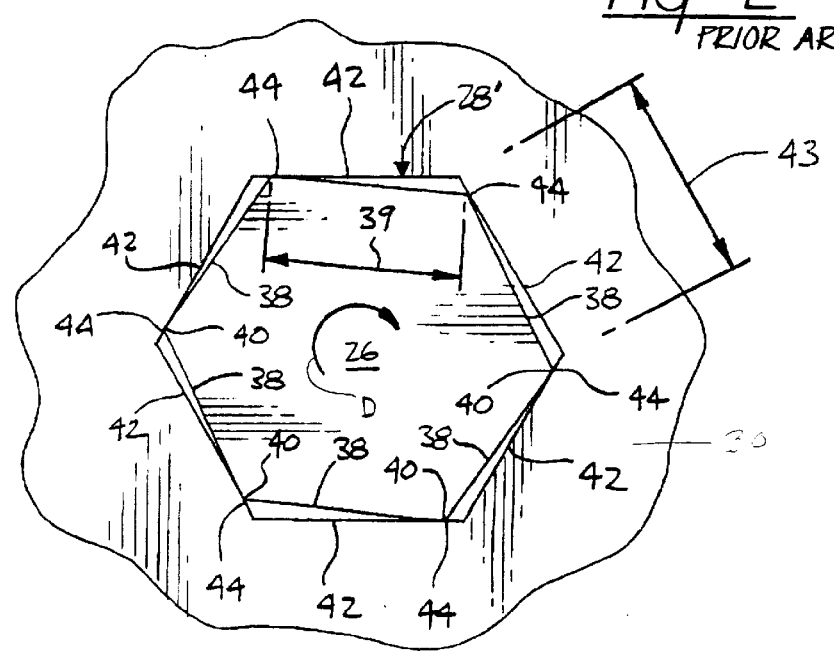
FIG. 2 is a cross sectional view illustrating a prior art torsion bar and socket system.

Turning now to the cross sectional view of FIG. 2, a second end portion 26 of torsion bar 24 and a prior art configured second socket 28' are illustrated in detail. End portion 26 is hexagon shaped in cross section having six side walls 38, all of equal length 39. Each side wall 38 meets an adjacent side wall at edge 40 at a 120 degree angle from the adjacent side walls 38. Prior art socket 28' is formed having 6 planar base structures or surfaces 42, all of equal length 43. Length 43 of the planar base structures 42 is slightly larger than length 39 of side walls 38 to allow ready insertion of the second end portion 26 into the socket 28'.

In a jounce condition the wheel forces the lower control arm 12 to pivot upward, which rotates first socket 20. First socket 20, through its contact with first end portion 22, imparts a rotational or twisting force on torsion bar 24 in the direction D. Second end portion 26 of torsion bar 24 engages second socket 28' of anchor member 30. Second socket 28' acts to prevent rotation of torsion bar 24 so that rotational energy is stored within torsion bar 24 and it tends to return to a less rotationally stressed or twisted position. The references prior art first socket is substantially identical to the prior art second socket 28' shown in FIG. 2 and described previously in detail. In jounce, the edges 40 of second end portion 26 contact planar base structures or surfaces 42 of second socket 28'. This creates six lines of contact 44 by which the rotational movement of the second end portion 26 of torsion bar 24 is opposed by the anchor 30. It should be appreciated that six lines of contact are also formed between the first end portion 22 and the first socket 20, the only difference, being that torsion bar 24 acts to counter the rotational movement of the first socket 20, whereas the torsion bar imparts rotational force onto the second socket 28'.

Figure 3:
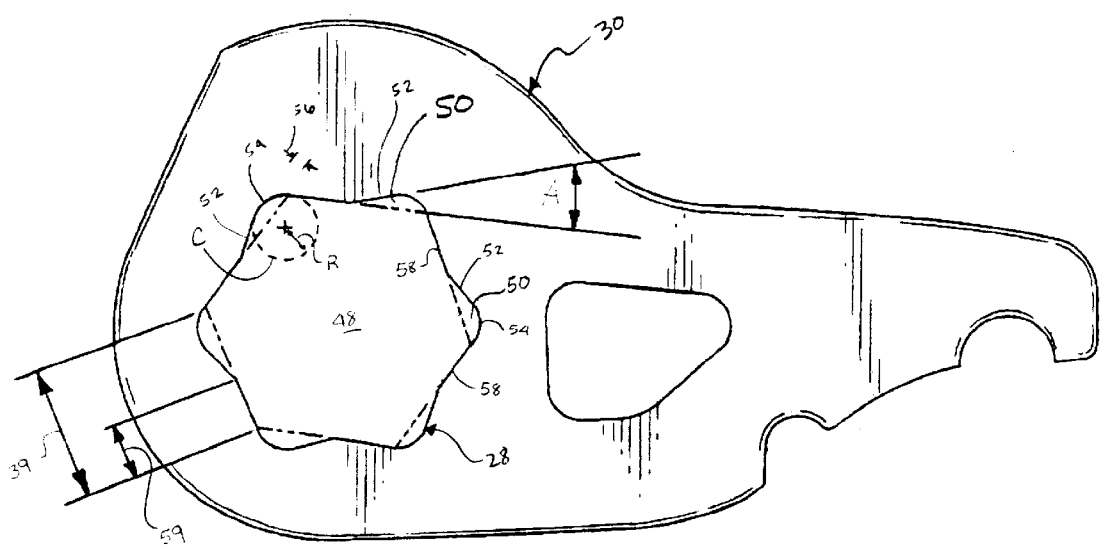
FIG. 3 is a cross sectional view illustrating the socket system of the present invention.

Turning to FIG. 3, a preferred embodiment of the present invention is shown. FIG. 3 illustrates the anchor member 30 with second socket 28 of the present invention without an end of the torsion bar 24 inserted therein. The improvement lies in the construction of the first socket 20 and the second socket 28. It should be appreciated that although not shown, first socket 20 is a mirror image of the second socket 28. The first socket 20 contacts the first end portion 22 of torsion bar 24 when socket 20 is pivoted clockwise in FIG. 1 from a rebound position. The second socket 28 contacts the second end portion 26 to counteract the rotational force imparted on the torsion bar 24 by pivoting of the lower control arm 14.

As best seen in FIG. 3, the second socket 28 includes a hexagonal opening 48 (outlined with dashes) with scalloped openings 50 extending therefrom. The hexagonal opening 48 is substantially equal in size to the second end portion 26 of the torsion bar 24. The scalloped openings 50 extend from the hexagonal opening 48 at an angle A. Angle A is preferably between 5 and 45 degree, more preferably between 10 and 25 degrees, and most preferably between 15 and 20 degrees. In the preferred embodiment, angle A is roughly 17 degrees that is formed between the hexagonal opening 48 and an extending side wall 52. Extending side wall 52 projects until it becomes tangent with a circular side wall 54. Circular side wall 54 is defined by a circle C having a radius R greater that the width 56 of a scalloped opening 50, but less that the length 59 of contact wall 58. Circular side wall 54 extends until it becomes tangent with the hexagonal opening 48, at which point it merges with a contact wall 58 extending therefrom. Contact wall 58 which defines a portion of the hexagonal opening 48 is tangent to the circle C used to define the circular side wall 54 and also contacts extending side wall 52.

Figure 4:
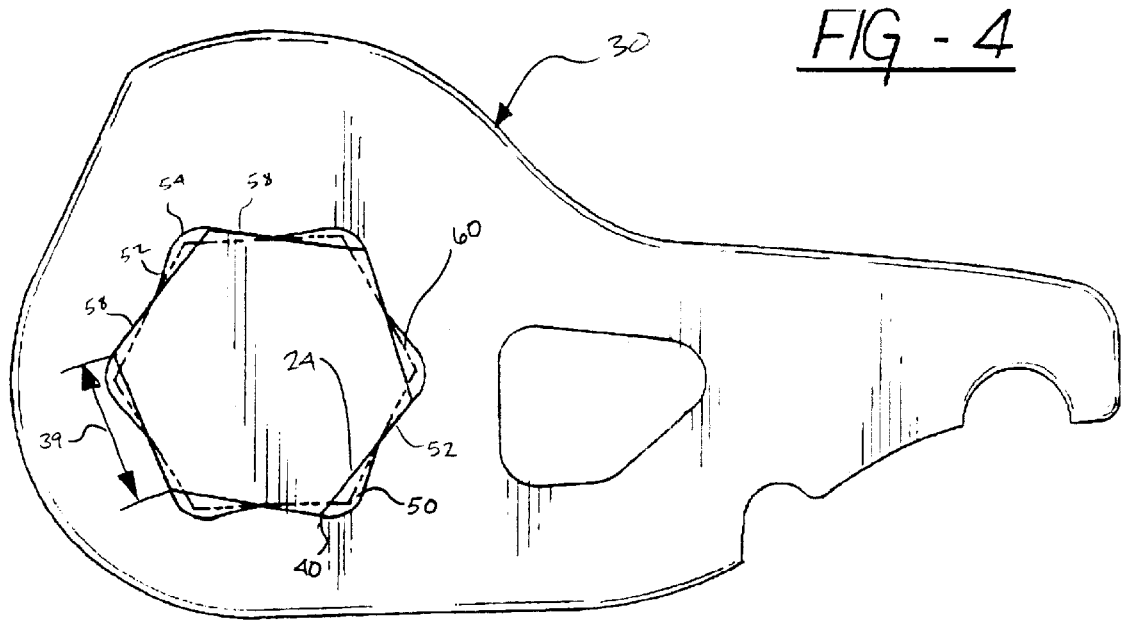
FIG. 4 is a cross sectional view along the line 2—2 of FIG. 1 illustrating the improved torsion bar and socket system of the present invention, including the insertion position of the torsion bar shown in phantom.

Turning to FIG. 4, the torsion bar 24 and anchor member with socket 28 is illustrated. The torsion bar 24 is inserted into the socket 28 at the relative insertion position 60 illustrated in phantom. It should be appreciated that at this insertion position, the amount of clearance between the end of torsion bar 24 and the socket 28 is greatly increased over the prior art. It should further be appreciated that either the torsion bar 24 or the socket 28 can be pivoted to establish the operative condition or positioning 62 between bar 24 and socket 28 that is illustrated by solid lines in FIG. 4. In the operative condition 62, the side walls 38 of the torsion bar 24 are in substantial surface contact with the contact walls 58 of the socket 28. The present invention provides a substantial face area of contact between the torsion bar 24 and the socket 28, which is a vast improvement over the line contact of the prior art.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An apparatus for one of applying to and receiving torque from a corresponding tool, said tool having a plurality of sides interconnected by edges that define an end portion, said apparatus comprising:

a member having a socket including a main opening that is substantially equal in size to said end portion of said corresponding tool, said socket further including a plurality of scalloped openings that are equal in number to said plurality of sides of said tool, each of said scalloped openings forming an extending wall and a circular side wall, each of said plurality of sides of said tool contacting said extending wall and a portion of said circular side wall.

2. The apparatus as set forth in claim 1, wherein said extending wall extends at an angle from said main opening.

3. The apparatus as set forth in claim 1, wherein said scalloped openings are adapted to receive said edges of said tool while said tool is being inserted into said socket.

4. The apparatus as set forth in claim 2, wherein said angle is between 5 and 45 degrees.

5. The apparatus as set forth in claim 2, wherein said angle is between 15 and 20 degrees.

6. The apparatus as set forth in claim 2, wherein said scalloped opening includes a width and said circular wall is defined by a circle having a radius, said radius being larger that said width.

7. The apparatus as set forth in claim 6, further comprising a contact wall that defines a portion of said main opening, said contact wall having a length, said length being larger than said radius, said contact wall is interconnected with said circular wall and is formed at a tangent thereto.

8. The apparatus as set forth in claim 7, wherein said contact wall is adapted to contact said tool and provide either rotational force or resistance thereto.

9. A torsion bar anchor for a motor vehicle for use with a torsion bar having a plurality of sides that define an end portion, said torsion bar anchor comprising:

a member having a socket including a main opening that is substantially equal in size to said end portion of said torsion bar, said socket further including a plurality of scalloped openings that are equal in number to said plurality of sides of said torsion bar, each of said scalloped openings forming a contact wall and a circular side wall, said end portion contacting said contact wall and a portion of said circular side wall.

10. The apparatus as set forth in claim 9, wherein said extending wall extends at an angle from said main opening.

11. The apparatus as set forth in claim 9, wherein said scalloped openings are adapted to receive said edges of said tool while said tool is being inserted into said socket.

12. The apparatus as set forth in claim 10, wherein said angle is between 5 and 45 degrees.

13. The apparatus as set forth in claim 10, wherein said angle is between 15 and 20 degrees.

14. The apparatus as set forth in claim 10, wherein said scalloped opening includes a width and said circular wall is defined by a circle having a radius, said radius being larger that said width.

15. The apparatus as set forth in claim 14, further comprising a contact wall that defines a portion of said main opening, said contact wall having a length, said length being larger than said radius, said contact wall is interconnected with said circular wall and is formed at a tangent thereto.

16. The apparatus as set forth in claim 15, wherein said contact wall is adapted to contact said torsion bar and provide either rotational force or resistance thereto.

17. A torsion bar anchor for a motor vehicle for use with a torsion bar, said torsion bar having an end portion having a hexagon shaped cross section, said end portion having six side walls interconnected by edges, said torsion bar anchor comprising:

a socket having a main opening that is substantially equal in size to said hexagonal shaped cross section of said end portion of said torsion bar, said socket also having six scalloped openings, wherein each of said scalloped openings is defined by an extending wall that extends at an angle from said main opening and a circular wall that interconnects said extending wall and a contact wall, said contact wall defines a portion of said main opening and is adapted to contact one of said six sides of said torsion bar, said scalloped openings are adapted to receive said edges of said torsion bar while said torsion bar is being inserted into said socket.

* * * * *

UNITED STATES PATENT AND TRADEMARK OFFICE
CERTIFICATE OF CORRECTION

PATENT NO.     : 6,364,297 B1
DATED          : April 2, 2002
INVENTOR(S)    : Matthew W. Weber It is certified that error appears in the above-identified patent and that said Letters Patent is hereby corrected as shown below:

<u>Title page,</u>
Item [74], *Attorney, Agent, or Firm*, "Robert E. Smith" should read -- Ralph E. Smith --.

Signed and Sealed this

Twenty-sixth Day of August, 2003

JAMES E. ROGAN
*Director of the United States Patent and Trademark Office*